Sept. 2, 1969  H. D. SISK  3,465,188
LAMINATED MOTOR STATOR WITH BONDING MATERIAL, THROUGH
BOLTS, AND WELDS
Filed Aug. 11, 1967

INVENTOR
HOLLIS D. SISK
BY William R. O'Meara

United States Patent Office 3,465,188
Patented Sept. 2, 1969

3,465,188
LAMINATED MOTOR STATOR WITH BONDING MATERIAL, THROUGH BOLTS, AND WELDS
Hollis D. Sisk, Chesterfield, Mo., assignor to Wagner Electric Corporation, Newark, N.J., a corporation of Delaware
Filed Aug. 11, 1967, Ser. No. 664,230
Int. Cl. H02k 1/18
U.S. Cl. 310—217　　　　　　　　　　　　　　13 Claims

ABSTRACT OF THE DISCLOSURE

A laminated stator core having a plurality of axially extending mounting holes spaced from the periphery of the core for respectively receiving mounting bolts is provided with a plurality of axially extending welds extending across the periphery of the core and located respectively closely adjacent to the mounting holes to stiffen laminations and reduce the compressibility of the core in regions of the core adjacent to the mounting holes. The stator core is formed with a core projecttion radially outwardly of each mounting hole to provide adequate yoke cross-section and to provide an axial core corner along the periphery of the core for welding. An insulating bonding material, as thermosetting resin, may be used between laminations.

This invention relates to laminated magneic cores and more particularly to laminated magnetic cores for dynamoelectric devices.

In the past, there were certain problems connected with some electric motors, such as a hermetic motor of a refrigeration motor-compressor unit where the stator of the motor was mounted to a supporting member or end plate at only one end thereof by a plurality of bolts extending through mounting openings provided in the stator core and threadedly received in the supporting member. One of the undersirable or disadvantageous features of some past stator constructions was that during the mounting of the stator the laminations thereof sometimes shifted radially relative to other laminations, producing a non-uniform air gap between the rotor and stator bore. This relative shifting of laminations often occurred with past constructions even though the laminations were held together by peripheral welds or other mechanical lamination securing means. The cause of such relative shifting of laminations in some past stator core constructions was believed to be, at least in part, because of the compressibility of such core constructions in regions of the core near the mounting holes and because of unbalanced axial loading on the stator core as the individual mounting bolts were tightened to secure the stator to the supporting member. In some past stator core constructions, in an attempt to overcome the above problems, the laminations were bonded together by providing a film of thermoresponsive adhesive material between adjacent laminations as well as welds or other mechanical means. While the adhesive material between layers tended to prevent the radial shifting of laminations during the mounting of the core to an end supporting member, the adhesive tended to soften and flow away from regions of the laminations about the mounting holes when the unit was subsequently heated to drive out moisture, as is usually done in the case of a motor-compressor unit. This softening of the adhesive material between laminations has resulted, in some cases, in the undesirable or disadvantageous feature of considerable loss of bolt tension acting on the core or bolt torque so that the stator no longer was rigidly mounted in the unit and there was danger of losing the air gap uniformity.

The principal object of the present invention is to provide a novel laminated magnetic core which substantially obviates the aforementioned undesirable or disadvantageous features, as well as others, and this and other advantageous features of the present invention will become apparent hereinafter.

Briefly, in accordance with one aspect of the present invention, there is provided a laminated magnetic core adapted to be mounted to a supporting member by a plurality of fastening means, the core being provided with a plurality of mounting openings therethrough for respectively receiving the fastening means, and a plurality of mechanical securing means extending across the periphery thereof respectively closely adjacent to the mounting openings to minimize the compressibility of the core in regions near the mounting holes.

In the drawing which illustrates embodiments of the present invention, and wherein like parts are identified by like numerals wherever they occur:

Figure 1:
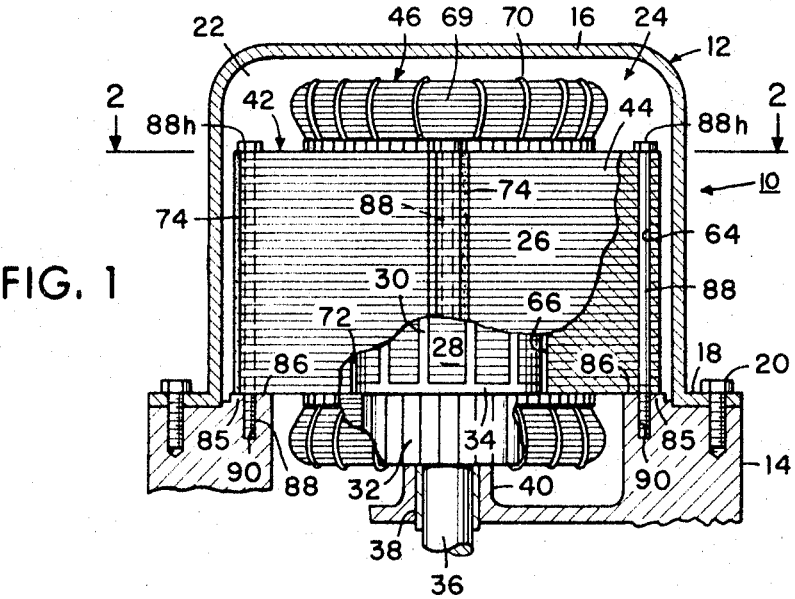
FIG. 1 is a fragmentary sectional view of a motor-compressor unit incorporating a stator constructed in accordance with the present invention.

Referring now to the drawing and more particularly to FIG. 1, a partially illustrated hermetically sealed motor-compressor unit is indicated generally at 10. Unit 10 includes a hermetically sealed motor-compressor casing 12 including a housing 14 and an enclosing cover member 16 having an annular, radial flange 18. The cover 16 is secured to the casing 14 by a plurality of bolts 20 which extend vertically through the flange 18 and are threadedly received in the casing 14. The casing 14 and cover 16 form a motor chamber 22 in which is mounted an electric motor 24 embodying one form of the present invention.

The motor 24 is shown as an induction motor which includes a stator 26 and a conventional laminated rotor 28 having a squirrel cage winding 30. The rotor 28 is provided with a fan 32 which may be integrally connected with end ring 34 of the rotor winding 30. A shaft 36 is fixed to the rotor 28 and supported for rotation in a sleeve bearing 38 disposed in an axial, integral extension 40 of the casing 14.

Figure 2:
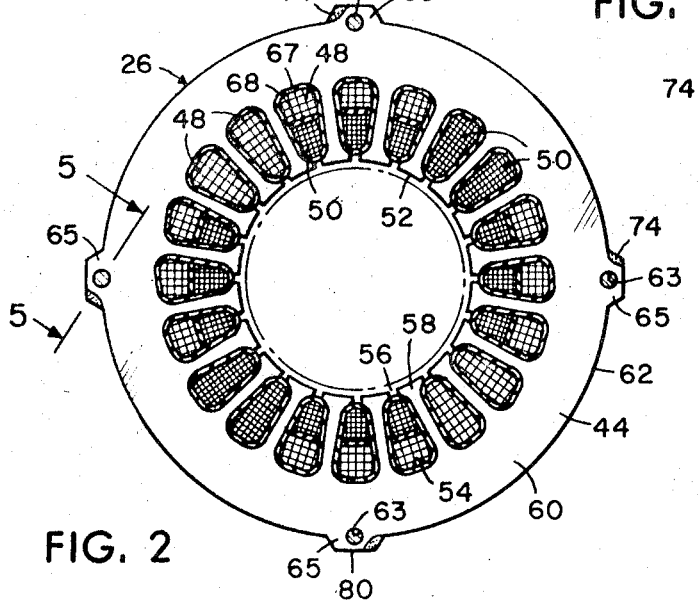
FIG. 2 is a view taken along the line 2—2 of FIG. 1.

The stator 26 includes a laminated magnetic core 42 formed from a plurality of like laminations 44 stamped or punched from magnetic material, such as from a sheet of suitable electrical grade steel, and motor windings, indicated generally at 46, which include running and auxiliary windings indicated respectively at 48 and 50 in FIG. 2.

Each lamination 44 of core 42 is formed with a central opening 52 and a plurality of angularly spaced, radially extending grooves 54 connected with the opening 52 by small entranceways 56 between teeth 58 that are formed between the grooves 54. The teeth 58 in each lamination 44 connect with a yoke portion 60 between the radially outer walls of grooves 54 and an outer generally circular peripheral edge 62 of the lamination. Each lamination 44 is provided with four equally spaced openings 63 adjacent to the peripheral edge 62 but spaced therefrom to provide four mounting holes 64 extending axially through the core 42 when the laminations are in stacked relation. Each lamination 44 is also provided with four integral, peripheral lamination extensions or radial ears 65 respectively in radial alignment with the openings 63. The laminations 44 are stacked with the central openings 52 and grooves 54 in alignment to provide an axial bore 66 (FIG. 1) and winding receiving stator slots extending through the core 42. Each of the stator slots receives a coil side of one or both of the windings 48 and 50, the coils being insulated from each other and the core 42 by any suitable or conventional insulating means which, in the illustrated embodiment, includes conventional slot liners 67 and coil insulators 68 in each slot. The windings 48 and 50 have end turns 69 at each end of the core 42 which may be secured in place by cord 70. The bore 66 of core 42 receives the rotor 28 and defines with the circular periphery of rotor 28 an air gap 72. As will be discussed in greater detail hereinafter, laminations 44 are secured together by four welds 74 extending axially entirely across the periphery of core 42 and which are respectively located closely adjacent to the mounting holes 64.

Figure 3:
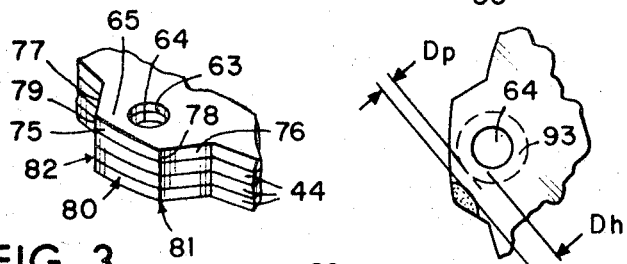
FIG. 3 is an enlarged fragmentary view of the stator core of FIGS. 1 and 2 but before the laminations of the stator core have been welded together.
Figures 4, 5:
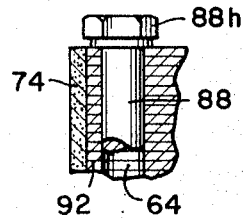
FIG. 4 is an enlarged fragmentary plan view of the stator core as shown in FIG. 2.
FIG. 5 is an enlarged sectional view taken along the line 5—5 of FIG. 2.

As seen in FIG. 3, which illustrates a portion of the stack of laminations 44 before the laminations are welded together, each lamination extension 65 has an outer arcuate edge surface portion 75 connecting with opposed, inwardly extending, straight side edge portions 76 and 77 that intersect portion 75 to form a pair of relatively sharp lamination edges or corners 78 and 79. The lamination extensions 65 of the stack form four peripheral, axially extending, core projections 80 with the lamination corners 78 and 79, respectively, forming peripheral, axially extending core edges or corners 81 and 82 adjacent to each mounting hole 64. A weld 74 is formed along each core edge 81 which extends across the entire length of the stack of laminations 44, FIG. 4, illustrating a portion of the core 42 after welding. The laminations 44 are thus clamped together by the four welds 74 respectively closely adjacent the four mounting holes 64. In FIG. 5, regions of the laminations adjacent a weld 74 are shown clamped together in lamination-to-lamination contact by the weld.

The core projections 80 formed by the lamination extensions 65 not only serve to provide sufficient yoke cross-sectional area in spite of the mounting holes 64 but also serve to provide advantageous axial core corners 81 along the length of the stack for welding purposes. As is well known, a welding arc generally has a tendency to follow a relatively small projection or mass, such as that provided by core corner 81, since the heat of the weld is not as quickly dissipated away from the projection to other portions of the core as it otherwise would be in the case of welding at a relatively large surface area. The welds 74 are thus consistently located at the desired location in successive cores during the manufacture thereof and are generally more uniform along the greater portion of the length thereof.

During the manufacture of core 42, each of the welds 74 may be formed while laminations 44 are in stacked relation and under a suitable compressive force, such as a force of four hundred pounds per square inch. For example, after the laminations 44 are stamped, they may be stacked on a conventional aligning and holding fixture (not shown) to the proper stack height and then the stack may be placed under compression by a suitable pressure member and welded together. Each weld may be formed by conventional welding mechanisms to provide a weld bead, for example ⅛ of an inch wide at the core periphery. The welded core may then be removed from the fixture and provided with windings 48 and 50.

As seen in FIG. 1, stator 26 is mounted to four angularly spaced housing portions or pads 85 formed integrally with housing 14. Each pad 85 has an upper planar end surface 86. The end surfaces 86 are all in a common plane which is normal to the rotational axis of the rotor 28. Four fastening members or throughbolts 88 respectively extend through the mounting holes 64 and are respectively threadedly received in four tapped holes 90 in the pads 85. The bolts 88 clamp the stator core 82 firmly against the four planar surfaces 86, the laminations of the core being under compressive forces between the heads, indicated at 88$h$, of bolts 88 and the planar surfaces 86.

Preferably, the welds 74 are located closely adjacent to or as close as possible to their respective mounting holes 64 but not so close that the welding operation or weld heat deforms the walls of the holes 64 and prevents insertion of the mounting bolts 88 therein. By positioning the welds 74 close to their respective mounting holes 64, the welds serve to stiffen regions of laminations 42 about or near the mounting holes 64, especially between the weld 74 and adjacent hole 64, and maintain these regions in relatively tight lamination-to-lamination contact throughout the length of the core to thereby greatly reduce the compressibility of the core in those regions about the mounting holes. In other words, the lamination regions that lie betwen each weld 74 and the wall of the adjacent hole 64 closest thereto form a substantially non-compressible solid column or zone, indicated generally at 92 in FIG. 5, that extends axially through the stack length of the core 42.

Referring again to FIG. 4, the linear average distance between the closest points on the wall of hole 64 and the adjacent weld 74 throughout the height of the core 42 is indicated at $D_h$. The pressure area or the area about the hole 64 which is directly subjected to the compressive force of the bolt head 88$h$ is indicated at 93, the area 93 indicating the effective lamination area which is engaged by the bolt head 88$h$ or other member, such as a washer if used, when the bolt 88 is tightened down. The distance between the closest points on the pressure area 93 and the weld 74 is indicated at $D_p$. It has been found that when the distance $D_p$ is about .125 of an inch or less that the compressibility of the core in regions adjacent the hole 64 or core zones 92 are substantially negligible when the bolts 88 are tightened down during mounting with the result that there is little tendency of the laminations 44 to shift radially relative to one another and adversely affect the air gap 72, even when no adhesive material is used to bond the laminations together.

Stator cores similar to core 42 were tested which had a mean diameter of about 5½ inches, an inner diameter or bore of 2¾ inches, 24 slots, laminations having a thickness of .025 inch, a stack height of 3⅛ inches, and four ¼ inch mounting holes. The laminations were of typical electrical grade, cold-reduced, non-silicon steel.

In one test an unbonded stator core of the type indicated above was provided with welds located along edges similar to edges 81 of core 42 and with the welds respectively spaced ($D_h$) about .156 of an inch from the mounting holes. The core was placed under compression by applying two thousand pounds to a ⅜ inch diameter spacer placed on the end of the core about .125 of an inch from the weld. Using a dial indicator type measuring device, the change in stack height at a point adjacent the spacer was measured and found to be only .025 of an inch. Using the same compressive force but with the spacer spaced .250 of an inch away from the weld, the change in stack height measured .060 of an inch. When the pressure was applied to the core at a location of about 2 inches away from the weld, the change in stack height measured about .075 of an inch. These tests indicated that the axial compressibility of the core at a point about .125 of an inch away from the weld was very little but more than doubled when the pressure was applied at a point only about .250 of an inch away from the weld, and that the compressibility of the core did not further increase greatly at points farther than .250 of an inch from the weld.

Each weld 74 and its adjacent mounting hole 64 are preferably so spaced that the distance ($D_p$) between the pressure area 93 or bolt head 88$h$ and the weld 74 is about 1/8 of an inch or less. In this way, when the bolts 88 are tightened down during the mounting thereof to the pads 85 they will apply the compressive force to a point on the core 42 which is substantially non-compressible as shown by the above tests. The average distance ($D_h$) between the weld 74 and adjacent mounting hole 64 throughout the length of the core is preferably about 3/16 of an inch or less where a bolt is used that applies a compressive force at a point about 1/16 of an inch or more from the edge of the hole.

Figure 6:
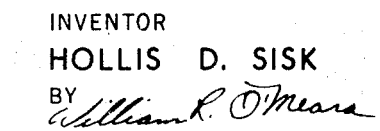
FIG. 6 is a sectional view of a stator core in modified form.

FIG. 6 illustrates a portion of a core 42$a$ that is identical to core 42 shown in FIGS. 1–5 but which has been provided with a suitable insulating and bonding material, indicated in exaggeration at 94. The bonding material 94 may be, for example, a hardened thermal responsive varnish, such as of the acrylic or epoxy resin type which serves to bond the laminations together as well as prevent or reduce rusting. The welded core, preferably before the windings and insulated core are provided, may be dipped or submerged in liquid varnish, such as of the thermosetting epoxy resin type, so that the varnish flows between laminations by capillary action to impregnate the core. The impregnated core may be removed from the liquid varnish and cured such as by heating it in an oven to a temperature at which the particular varnish used will cure or harden.

Further tests were made on cores of the above-described size and construction but which had been impregnated with an epoxy resin and were provided with welds spaced at various distances ($D_h$) from their respective mounting holes. The cores were compressed by 1/4 inch mounting bolts having an effective head diameter of about 3/8 inch. Each bolt was threadedly received in a tapped hole provided in a plate and tightened to a torque of 130 inch pounds, the core being compressed between the bolt head and plate. These cores were then subjected to a heat of 300° F. for 20 hours in an oven to simulate a dehydration process used in the manufacture of a motor-compressor unit. The cores were cooled and the torque required to turn the bolts was measured. A tabulation of these test results is given below:

| Approximate distance between weld and edge of hole ($D_h$), inches: | Torque required to turn bolt after heating (in. lbs.) |
|---|---|
| 5/32 | 125 |
| 3/16 | 115 |
| 1/4 | 106 |
| 11/32 | 99 |
| 7/16 | 95 |
| 17/32 | 95 |

The above indicated torque loss on the bolts is attributed to the flow of varnish away from the vicinity of the mounting hole while subjected to the heat of the oven and is indicative of the compressibility of the core in the vicinity of the mounting hole.

These tests clearly showed that when the distance $D_h$ between the weld and mounting hole was about 3/16 of an inch or less (distance $D_p$ about 1/8), the torque loss on the bolt after the core was removed from the oven was relatively small. For example, the tests showed that when the distance $D_h$ was about 5/32 of an inch, there was a torque loss of only 5 in. lbs. On the other hand, when the distance $D_h$ was about 1/4 of an inch away from the mounting hole, the loss of bolt torque was 24 in. lbs., and the torque loss increased to 35 in. lbs. as the distance $D_h$ increased, such losses being generally highly unsatisfactory. In some cases, the bolt torque dropped to 90 in. lbs., a loss of 40 in. lbs.

With the mounting holes 46 spaced inwardly from the outer periphery in the illustrated core 42, the full pressure applying area of the bolt head 88$h$ is utilized. Also, the core material between each mounting hole 64 and the outer periphery of the core resists any lateral forces or forces normal to the bolt axis that the core may be subjected to during and after mounting to prevent any enlargement of the hole and loss of air gap uniformity.

As previously mentioned herein, it is necessary to choose a location on the periphery of the stack of laminations such that the weld will not result in an obstruction or interfere with the subsequent insertion of the shank portion of the mounting bolt. Generally, the location for a weld sufficiently deep to provide a rigid core should be chosen not less than about 1/16 of an inch from the mounting hole to insure against damage to the walls of the mounting hole.

By locating the welds at distances ($D_h$) of about 3/16 of an inch or less from the mounting holes, the bolt head portion, which may include a washer or the like, will apply a compressive force on a portion of the core which is substantially non-compressible or normally used. In this way, such cores can be mounted with little tendency of the laminations to move radially relative to each other or deflect about the mounting hole, even when the core is not bonded. When such a stator core is bonded by a varnish, and subjected to a dehydration process in a motor-compressor unit, the loss of torque on the mounting bolts is minimized or relatively small so that the stator remains rigidly mounted.

From the foregoing, it is now apparent that a novel stator member meeting the objects and advantages set out hereinbefore, as well as others, is provided and that changes or modifications as to the precise configuration, shapes or details of the construction and operation thereof set forth in the disclosure by way of illustration may be made by those familiar with the art without departing from the true spirit of the invention.

The embodiments of the invention in which an exclusive property or privilege is claimed are defined as follows:

1. A stator member for a dynamoelectric machine adapted to be secured to a supporting member and subjected to compressive forces by a plurality of through-bolts comprising a stack of laminations of magnetic material having a bore extending axially therethrough, a radially outer periphery, and a plurality of mounting holes spaced from said periphery and extending axially therethrough for respectively receiving said through-bolts, and means for securing said laminations together including a plurality of welds extending axially across the periphery and disposed respectively adjacent to said mounting holes to stiffen regions of said laminations adjacent said mounting holes and substantially minimize subsequent compression of said regions by the compressive forces of said through-bolts, the average distance between each said weld and the respective mounting hole adjacent thereto being less than one-fourth of an inch.

2. A stator member for a dynamoelectric machine adapted to be secured to a supporting member and subjected to compressive forces by a plurality of through-bolts comprising a stack of laminations of magnetic material having a bore extending axially therethrough, a radially outer periphery, and a plurality of mounting holes spaced from said periphery and extending axially therethrough for respectively receiving said through-bolts, and means for securing said laminations together including a plurality of welds extending axially across the periphery and disposed respectively adjacent to said mounting holes to stiffen regions of said laminations adjacent said mounting holes and substantiially minimize subsequent compression of said regions by the compressive forces of said through-bolts, each said weld being disposed less than three-sixteenths of an inch from the respective mounting hole adjacent thereto.

3. A stator member for a dynamoelectric machine adapted to be secured to a supporting member and subjected to compressive forces by a plurality of through-bolts comprising a stack of laminations of magnetic material having a bore extending axially therethrough, a radially outer periphery, and a plurality of mounting holes spaced from said periphery and extending axially therethrough for respectively receiving said through-bolts, and means for securing said laminations together including a plurality of welds extending axially across the periphery and disposed respectively adjacent to said mounting holes to stiffen regions of said laminations adjacent said mounting holes and substantially minimize subsequent compression of said regions by the compressive forces of said through-bolts, each said weld being spaced between .062 and .25 of an inch from the respective mounting hole adjacent thereto throughout the axial length of said stack.

4. The stator member according to claim 3, including a hardened bonding material engaged between adjacent laminations throughout said stack.

5. A stator member for a dynamoelectric machine adapted to be secured to a supporting member by a plurality of through-bolt means having head portions for applying compressive forces to said stator member, comprising a stack of superposed laminations of magnetic material having a bore extending axially therethrough, a radially outer periphery, and a plurality of holes spaced from said periphery and extending axially therethrough for respectively receiving said through-bolts, and means for securing said laminations together including a plurality of welds extending axially across the periphery of said stack and disposed respectively adjacent to said mounting holes for securing said laminations together in lamination-to-laminaiton contact in regions adjacent said mounting holes to provide a substantially non-compressible, axially extending lamination zone through said stack between each said weld and its respective adjacent mounting hole so that said head portions apply compressive forces to said zones when said stator member is secured to said supporting member, the average distance between each said weld and an imaginary axial line intersecting the closest point on the head portion of the adjacent bolt that contacts said stack when the stator member is secured to said supporting member being less than one-eighth of an inch.

6. The stator member according to claim 5, further including a hardened film of varnish engaged between adjacent laminations through said stack.

7. A stator member for an electric motor adapted to be secured to a supporting member at only one end of the stator member by a plurality of through-bolts having head portions for applying compressive forces to said stator member, comprising a stack of laminations of magnetic material having a bore extending axially therethrough, a radially outer periphery, and a plurality of mounting holes extending axially through said stack for respectively receiving said mounting bolts, and means securing said laminations together including a plurality of metal securing means extending axially across said periphery respectively adjacent to said mounting holes securing said laminations together, each of said metal securing means being spaced from the mounting hole adjacent thereto a distance such that when said stator member is secured to said supporting member the average distance between each said metal securing means and an imaginary axial line intersecting the closest point on the head portion of the adjacent bolt is less than three-thirty seconds of an inch.

8. A stator member for an electric motor adapted to be secured to a supporting member and subjected to compressive force by a plurality of through-bolts comprising a stator core of magnetic laminations having a bore extending axially therethrough for receiving a motor rotor, a radially outer periphery, and a plurality of mounting holes spaced from said periphery and extending axially therethrough for respectively receiving said through-bolts, said core including core projections extending respectively radially outwardly of said mounting holes and axially for the axial length of said core, each of said projections having a radially outermost surface portion and a side wall portion intersecting said outermost surface forming an axially extending corner at the intersection thereof, a weld bead formed on each of said corners securing said laminations together and forming an essentially non-compressible zone extending axially through said core between said bead and said hole, each said bead and mounting hole adjacent thereto being spaced so that the compressive forces of said through-bolts are applied to said zones when said stator member is secured to said supporting member.

9. The stator member according to claim 8, wherein each said bead and the mounting hole adjacent thereto is spaced less than three-sixteenths of an inch apart throughout said core.

10. The stator member according to claim 8, wherein the closest distance between each said bead and the head portion of the through-bolt adjacent thereto when the stator member is secured to said supporting member is less than one-eighth of an inch.

11. A stator for an electric motor adapted to be secured to support means therefor by through-bolt means comprising an axially extending stack of laminations of magnetic material having a peripheral portion, aperture means extending axially through said stack radially inwardly of said peripheral portion for receiving said through-bolt means, and weld means on said peripheral portion extending axially across said stack adjacent to said aperture means and predeterminately spaced from said aperture means to respectively define therebetween substantially incompressible stack portions extending axially across said stack for accommodating the compressive forces of said through-bolt means when said stator is secured to its support means.

12. A stator according to claim 11, wherein said through-bolt means includes head means for compressive engagement with an end of said stack about said aperture means for applying the compressive force of said through-bolt means to said substantially incompressible stack portions, respectively.

13. A stator according to calim 12, wherein the engagement of said head means with said stack end defines a substantially annular pressure area therebtween about said aperture means, and the distance defined between said weld means and the closest portion of said pressure area to said weld means being not greater than about .187 inch.

References Cited

UNITED STATES PATENTS

| | | | |
|---|---|---|---|
| 2,393,065 | 1/1946 | Rose | 310—258 |
| 2,547,559 | 4/1951 | Roters | 318—166 |
| 2,650,316 | 8/1953 | Johns et al. | 310—258 |
| 3,012,162 | 12/1961 | Rediger | 310—259 |

FOREIGN PATENTS 703,529   2/1954   Great Britain.

OTHER REFERENCES

German printed application 1,037,573, Aug. 28, 1958, Treig.

WARREN E. RAY, Primary Examiner